Figure 1:
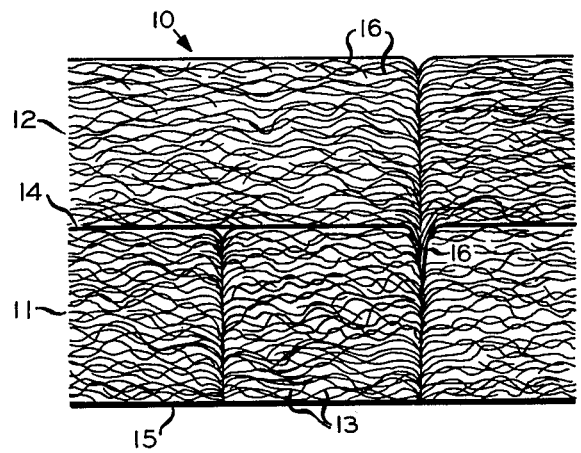

United States Patent [19]

Stoller

[11] 4,194,037
[45] Mar. 18, 1980

[54] FLAME-RESISTANT FABRIC AND METHOD OF FORMING SAME

[75] Inventor: Frederick L. Stoller, Greenville, S.C.

[73] Assignee: Phillips Petroleum Company, Bartlesville, Okla.

[21] Appl. No.: 700,434

[22] Filed: Jun. 28, 1976

Related U.S. Application Data

[63] Continuation of Ser. No. 516,478, Oct. 21, 1974, abandoned, which is a continuation-in-part of Ser. No. 249,866, May 3, 1972, abandoned.

[51] Int. Cl.² .................... D05C 15/00; D04H 3/08
[52] U.S. Cl. .................................. 428/92; 28/112; 156/72; 156/148; 428/93; 428/95; 428/96; 428/300; 428/301; 428/910; 428/920; 428/102; 428/287
[58] Field of Search .............. 428/910, 920, 921, 234, 428/235, 300, 301, 92, 94, 95, 96, 93; 156/72, 148; 28/72.2, 112, 111

[56] References Cited

U.S. PATENT DOCUMENTS

| | | | |
|---|---|---|---|
| 3,348,993 | 10/1967 | Sissons | 428/300 |
| 3,394,043 | 7/1968 | Parlin et al. | 428/93 |
| 3,458,387 | 7/1969 | Suskind et al. | 428/300 |
| 3,535,178 | 10/1970 | Parlin et al. | 156/72 |
| 3,733,226 | 5/1973 | Stotter | 428/93 |
| 3,861,992 | 1/1975 | De Nobriga et al. | 428/921 |
| 3,871,948 | 3/1975 | Norris | 156/148 |

FOREIGN PATENT DOCUMENTS

| | | | |
|---|---|---|---|
| 878207 | 8/1971 | Canada . | |
| 982801 | 2/1965 | United Kingdom | 28/112 |

Primary Examiner—James J. Bell

[57] ABSTRACT

This invention resides in a flame-resistant nonwoven fabric having an upper and a lower surface and comprising dyeable, flame-resistant fibers and base fibers. In one embodiment the upper surface is substantially, completely comprised of polyvinyl chloride fibers and the lower surface is a blend of adhering base fibers and polyvinyl chloride fibers. The fabric is formed by needling base fibers together to form a batt, needling polyvinyl chloride fibers and the batt together, and heating the lower surface of the fabric to adhere the polyvinyl chloride and base fibers together.

42 Claims, 2 Drawing Figures

FLAME-RESISTANT FABRIC AND METHOD OF FORMING SAME

This is a continuation of copending application Ser. No. 516,478, filed Oct. 21, 1974 now abandoned, which was a continuation-in-part of Ser. No. 249,866, filed May 3, 1972, now abandoned.

It is desirable to form a fabric that is flame-resistant. Further, it is desirable to provide a nonwoven needled fabric that is flame-resistant, printable, and dyeable and can be used for carpeting for example. It is also desirable to provide a tufted carpet wherein the face yarns are tufted through a nonwoven backing fabric, the upper surface of the backing fabric being flame-resistant and preferably also being dyeable.

This invention therefore resides in a flame-resistant nonwoven fabric having an upper surface and a lower surface and comprising flame-resistant fibers and base fibers. In one embodiment the upper surface is substantially completely comprised of polyvinyl chloride fibers and the lower surface is a blend of adhering base fibers and polyvinyl chloride fibers with said base fibers forming at least greater than about 50 percent of the total fibers forming said lower surface. The fabric is formed by needling base fibers together to form a batt, needling polyvinyl chloride fibers and the batt together, and heating the lower surface of the fabric to adhere the polyvinyl chloride and base fibers together. This nonwoven fabric can then be employed as the backing fabric in the manufacture of tufted carpeting, with the top surface of the fabric, as incorporated in the carpeting, being the polyvinyl chloride side of the fabric. The polyvinyl chloride fibers can be dyed at the same time as the face yarns. Thus, the upper surface of the backing in the carpeting is both dyeable and flame retardant. While it is presently preferred that the upper surface be at least substantially completely composed of polyvinyl chloride fibers, the upper surface can be a blend of polyvinyl chloride fibers and base fibers with the concentration of the polyvinyl chloride fibers being sufficiently great to provide the desired degree of flame resistance, and also, if desired, the desired degree of dyeability. In general the polyvinyl chloride fibers will constitute at least 50 weight percent, preferably at least 70 weight percent, and more preferably at least 90 weight percent, of the fibers in the cap layer.

In the method of this invention, a multiplicity of base fibers are needled together to form a nonwoven batt having upper and lower surfaces. The base fibers can for example be one of polypropylene, polyester, polyamides, polyacrylics, or mixtures thereof. The base fibers can be laid down on a scrim carrier and thereafter needled or needled together in the absence of the scrim carrier as is known in the art. This first needle punching operation will employ a suitable needle density. In general the batt will receive from about 300 to about 600 needle punches per square inch.

At least one cap layer of polyvinyl chloride fibers is laid down on the upper surfaces of the preneedled batt of base fibers and thereafter the batt and the polyvinyl chloride fibers are needled together to form the needled fabric of this invention which has upper and lower surfaces. This sequence is important because if the base layer is not needled before the addition of the cap layer, the mixing of the polyvinyl chloride fibers from the cap layer into the base layer in the subsequent needling operation is excessive, reducing the tensile properties obtainable for the fused fabric. A suitable needle punch density is employed in this second needle punching operation, which generally will be in the range of about 300 to about 600 needle punches per square inch.

In the presently preferred embodiment, the cap layer is composed entirely of polyvinyl chloride fibers and the polyvinyl chloride fibers are of a volume sufficient for at least substantially completely covering the upper surface of the batt while comprising from 1 to 25%, more preferably from about 5 to about 15%, of the total fibers on the lower surface of the needled fabric, the balance of the lower surface being the base fiber. In another embodiment, the polyvinyl chloride fibers are of a volume sufficient for substantially completely covering the upper surface of the batt while comprising greater than about 40 percent of the total fibers on the lower surface of the needled fabric. This latter embodiment provides some degree of dyeability and fire retardancy for the lower surface of the fabric, but presents significantly greater difficulties in the subsequent thermal bonding of the fibers in the lower surface of the needled fabric. The presence of the polyvinyl chloride fibers in the layer of base fibers lowers the tensile properties of the fabric from what would be achieved from a similar fabric composed entirely of the base fibers. An increase in the quantity of polyvinyl chloride fibers in the bottom surface of the fabric further reduces the tensile properties of the fabric. This reduction in tensile properties is one of the principal reasons for the formation of the fabric from a bottom layer composed entirely of base fibers and a cap layer composed at least primarily of polyvinyl chloride fibers rather than the simpler technique of a single layer composed of a blend of base fibers and polyvinyl chloride fibers.

The polyvinyl chloride fibers that can be used in the method of this invention are characterized as follows: spinning a polymer of vinyl chloride into filaments having a denier of about 2–30 or more. The filaments may be crimped in the usual manner and are cut into staples, usually from 3–6 inches in length. The polyvinyl chloride used in this invention can be as shown in *Textile Encyclopedia*, J. J. Press, Ed., Textile Book Publishers, Inc., 1959, pages 127–128.

The polyvinyl chloride fibers used in the tests reported below had a denier of 3.5 and were cut to staple 4 inches in length. (Clevyl-T, Rhovyl, France).

The needled fabric is thereafter heated on at least its lower surface to adhere the polyvinyl chloride and base fibers. This adhering of the fibers can be accomplished by, for example, contacting the lower surface of the batt with a heated roller while passing the needled fabric through the nip of a pair of cooperating rollers. The nip roller in contact with the lower surface of the batt can be heated electrically or with a hot fluid to a suitable temperature to effect the thermal bonding of the fibers in the lower surface of the needled batt. Other heating means can be employed instead of or in addition to heated rollers, for example infrared heaters directed toward the surface to be bonded. When it is desirable to bond the fibers in both the upper surface and the lower surface of the needled fabric, the heating means utilized for the upper surface should be adjusted for the optimum bonding conditions for the polyvinyl chloride fibers while the heating means utilized for the lower surface should be adjusted for the optimum bonding conditions for the base fibers. If the lower surface of the needled fabric contains over 30 percent polyvinyl chloride fibers, the thermal bonding of the base fibers becomes difficult, as the polyvinyl chloride fibers soften as the temperature reaches a value in the range of 60° to 71° C. (140° to 160° F.), whereas polypropylene fibers have a melting point of approximately 171° C. (340° F.), polyethylene terephthalate fibers have a melting point in the range of 258° to 263° C. (496° to 505° F.), and Orlon and Acrilan polyacrylic fibers have a melting point of approximately 220° C. (428° F.). The softened polyvinyl chloride fibers will droop and severely diminish their contribution to the tensile strength of the bonded fabric long before the base fibers each bonding temperature. The softened polyvinyl chloride will also tend to stick to processing surfaces, thereby interfering with efficient processing. The sequence of needling the base layer, adding the cap layer, needling the composite, and then fusing the exposed base layer surface is important. If the base layer were to be fused before the cap layer is added, either a second pass through the heating equipment or a complicated equipment layout would be required to achieve thermal bonding of any of the polyvinyl chloride fibers. Either system would be economically disadvantageous, and it is believed that the product of either of these alternative systems would be inferior with respect to tensile properties.

In one embodiment, the volume of polyvinyl chloride fibers is preferably sufficient for forming a needled fabric having an upper surface that is substantially completely polyvinyl chloride fibers and having a lower surface that comprises polyvinyl chloride fibers in the range of about 35 to about 75 percent of the total fibers located at or forming the lower surface of the needled fabric. At polyvinyl chloride volumes less than that sufficient to form about 30 percent of the lower surface of the fabric, the resultant needled fabric will not be sufficiently flame-resistant to avoid a dangerous condition and to prevent excessive damage to the resultant fabric when contacted with flame or high temperatures from the bottom. In any event, the facing will be essentially 100 percent polyvinyl chloride which is flame-resistant while the entire structure has the firm support of a heat sealed nonwoven fabric.

In the presently preferred embodiment, the volume of polyvinyl chloride fibers is preferably sufficient for forming a needled fabric having an upper surface that is at least substantially completely composed of polyvinyl chloride fibers and having a lower surface composed of 75 to 99 percent base fibers and 25 to 1 percent polyvinyl chloride fibers. This fabric has the advantages of a flame retardant upper surface, a dyeable upper surface, and a readily bonded lower surface permitting greater tensile strengths than fabrics containing higher amounts of polyvinyl chloride fibers in the lower surface. In a more preferred embodiment, the polyvinyl chloride fibers will constitute from about 5 to about 15 percent of the total fibers in the lower surface, with the base fibers constituting the balance.

The polyvinyl chloride fibers can be randomly oriented relative to the batt or at least a portion of the polyvinyl chloride fibers can be oriented in a preselected direction.

Figure 2:
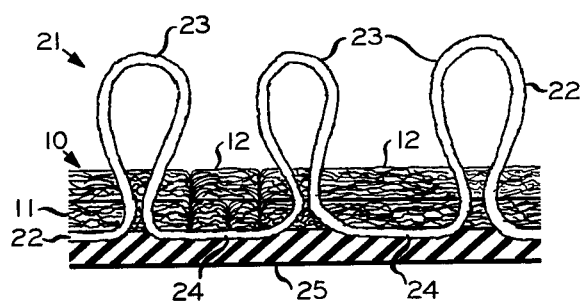

Referring now to the drawings,

FIG. 1 is a vertical cross section through the needle punched fabric of the present invention, and FIG. 2 is a vertical cross section through a tufted carpeting employing the needle punched fabric of FIG. 1.

The needle punched fabric 10 shown in FIG. 1 contains a lower layer 11 and an upper layer 12. The lower layer 11 was prepared by needling together one or more layers of staple base fibers 13 in a first needle punching operation to form a nonwoven needled batt having an upper surface 14 and a lower surface 15. The upper layer 12 of staple polyvinyl chloride fibers 16 was then deposited on the upper surface 14 of the needled batt. Thereafter the composite material was subjected to a second needle punching operation only from the top, or the polyvinyl chloride side, of the composite pushing some of the polyvinyl chloride fibers 16 downwardly into the lower layer 11 to form an integral nonwoven, needled fabric 10. Thus, the upper layer 12 of the fabric 10 contains essentially only polyvinyl chloride fibers 16, while the lower layer 11 of the fabric 10 contains the base fibers 13 and those polyvinyl chloride fibers 16 which were carried into the lower layer 11 by the second needle punching operation. The lower surface 15 of the nonwoven, needled fabric 10 was then subjected to heat to fuse together the base fibers at points of contact in the lower portion of lower layer 11.

Referring now to FIG. 2, the carpeting 21 comprises backing fabric 10, face yarns 22 which have been tufted through the backing fabric to form pile loops 23 above the backing fabric 10, the pile loops 23 being linked by connecting loops 24 closely drawn against the undersurface of the backing fabric 10. The undersurface of the tufted fabric can then be covered with a relatively thin anchoring coating 25 of an adhesive material such as latex or an applied coating derived from melted resins. Upon application, the coating material flows freely into the openings between fibers in the lower portion of the backing fabric 10 and surrounds the connecting loops 24. The latex coating 25 can then be cured; or, if other forms of adhesive coating are employed, the coating 25 is allowed to harden and set as required.

For clarity and simplicity, only one needle punch in the base layer and one needle punch in the composite material are shown in the drawings, while in actual practice the number of needle punches through both the cap layer 12 and the base layer 11 will be in the range of about 300 to about 600 per square inch as a result of the second needle punching operation. In addition, the base layer 11 will generally contain from about 300 to about 600 needle punches per square inch as a result of the first needle punching operation.

The following are the results of flame tests performed on needled fabrics containing mixtures of fibers.

Description of the Fabrics

Clevyl-T (Rhone-Poulenc Textile Division)

Any polyvinyl chloride fiber

1. Polypropylene 100%, needle punched and fused on both sides
2. Polypropylene 100%, needle punched and fused on one side only
3. Polypropylene 50% Polyvinyl chloride 50%, needle punched and fused on base side only
4. Polypropylene 25% Polyvinyl chloride 75%, needle punched and fused on base side only
5. Polyvinyl chloride 100%, needle punched and unfused

| Description of the Tests Vertical FAA flammability test, warp direction only | | |
|---|---|---|
| Sample | Burning time, sec. | Char Length, in. |
| 1 | 59.5 | 7.41 |

-continued

Description of the Tests
Vertical FAA flammability test, warp direction only

| Sample | Burning time, sec. | Char Length, in. | |
|---|---|---|---|
| 2 | 64.3 | 7.58 | |
| 3 | 16.0 | 4-1/16 | average of |
| 4 | 10.0 | 5-2/16 | 3 samples |
| 5 | 12.0 | 0 | |
| 6 (Jute) | 43.2 | 12.00 (6 samples completely consumed) | |

The tests show that a mixture of 50% polyvinyl chloride/50% base fiber is effectively flame retardant. Thus a structure having 100% polyvinyl chloride face fibers and needle punched to an effective supporting structure will be flame retardant at least on one side and provided about 40% of the polyvinyl chloride is carried through the supporting structure, it will also be flame retardant on the bottom. It is also apparent from these tests, that a cap of mixed fibers, 25–50% base fibers/75–50% polyvinyl chloride, can be needle punched into a preneedled supporting structure to provide a flame retardant capped surface.

While the invention has been described in terms of polyvinyl chloride fibers as the flame-resistant fibers, other suitable flame-resistant fibers can be employed in admixture with or in lieu of the polyvinyl chloride fibers. Examples of other suitable flame-resistant fibers include glass fibers; fibers of fluorocarbon polymers such as polytetrafluoroethylene; fibers of a poly(arylene sulfide); fibers of polymers such as nylon, polyester, and polyolefins containing fire retardant additives; and mixtures thereof. Polyvinyl chloride fibers are the presently preferred fire resistant fibers.

Other modifications and alterations of this invention will become apparent to those skilled in the art from the foregoing discussion and examples and it should be understood that this invention is not to be unduly limited thereto.

I claim:

1. A method for forming a flame-resistant, nonwoven fabric, comprising:
   needling together a multiplicity of base fibers to form a nonwoven, needled batt having upper and lower surfaces, said base fibers being formed of a material selected from the group consisting of polypropylene, polyester, polyamide, polyacrylic and admixtures thereof;
   laying down at least one flame-resistant layer of fibers on the upper surface of said batt to at least substantially completely cover the upper surface of said batt; wherein said layer comprises polyvinyl chloride fibers in an amount sufficient to provide the desired degree of flame resistance;
   needling said flame-resistant fibers into said batt to form a nonwoven, needled fabric; and
   heating the lower surface of the batt of said needled fabric to a temperature sufficient to adhere together the fibers positioned at said lower surface.

2. A method in accordance with claim 1 wherein said flame-resistant layer consists essentially of polyvinyl chloride fibers.

3. A method in accordance with claim 2 wherein said base fibers are polypropylene fibers.

4. A flame-resistant, nonwoven fabric formed by the process of claim 1 and having a thermally bonded lower layer comprising base fibers and polyvinyl chloride fibers and an upper layer comprising polyvinyl chloride fibers.

5. A fabric in accordance with claim 4 wherein said lower layer comprises from 75 to 99 percent base fibers, with the balance being said polyvinyl chloride fibers; and wherein at least 70 percent of the fibers in said upper layer are polyvinyl chloride fibers.

6. A fabric in accordance with claim 5 wherein essentially all of the fibers in said upper layer are polyvinyl chloride fibers.

7. A fabric in accordance with claim 6 wherein said base fibers are polypropylene fibers.

8. A fabric in accordance with claim 7 wherein from 85 to 95 percent of the fibers in said lower layer are base fibers.

9. An article of manufacture comprising a flame-resistant, fabric formed by:
   needling together a multiplicity of polypropylene base fibers to form a nonwoven, needled batt having upper and lower surfaces;
   laying down at least one flame-resistant layer of fibers on the upper surface of said batt to at least substantially completely cover the upper surface of said batt; wherein said layer comprises polyvinyl chloride fibers in an amount sufficient to provide the desired degree of flame resistance;
   needling said flame-resistant fibers into said batt to form a nonwoven, needled fabric; and
   heating the lower surface of the batt of said needled fabric to a temperature sufficient to adhere together the fibers positioned at said lower surface to thereby produce a flame-resistant, nonwoven fabric having a thermally bonded lower layer comprising 85 to 95 percent polypropylene fibers with the balance being polyvinyl chloride fibers and an upper layer comprising essentially all polyvinyl chloride fibers, said flame-resistant nonwoven fabric having a plurality of face yarns tufted through said flame-resistant, nonwoven fabric to form pile loops above said upper layer of the flame-resistant, nonwoven fabric and connecting loops below said lower layer of the flame-resistant, nonwoven fabric.

10. An article of manufacture in accordance with claim 9 further comprising an anchoring coating on the lower surface of said lower layer to bond said connecting loops to said fabric.

11. An article of manufacture comprising a flame-resistant, nonwoven fabric formed by:
   needling together a multiplicity of base fibers to form a nonwoven, needled batt having upper and lower surfaces; said base fibers being formed of a material selected from the group consisting of polypropylene, polyester, polyamide, polyacrylic and admixtures thereof;
   laying down at least one flame-resistant layer of fibers on the upper surface of said batt to at least substantially completely cover the upper surface of said batt; wherein said layer comprises polyvinyl chloride fibers in an amount sufficient to provide the desired degree of flame resistance;
   needling said flame-resistant fibers into said batt to form a nonwoven, needled fabric; and
   heating the lower surface of the batt of said needled fabric to a temperature sufficient to adhere together the fibers positioned at said lower surface to thereby produce a flame-resistant, nonwoven fabric having a thermally bonded lower layer comprising less fibers and polyvinyl chloride fibers and an upper layer comprising polyvinyl chloride fibers, said flame-resistant nonwoven fabric having a plurality of face yarns tufted through said flame-resistant, nonwoven fabric to form pile loops above said upper layer of the flame-resistant, nonwoven fabric and connecting loops below said lower layer of the flame-resistant nonwoven fabric.

12. A method for forming a flame-resistant, nonwoven fabric, comprising:
needling together a multiplicity of base fibers to form a nonwoven, needled batt having upper and lower surfaces, said base fibers being formed of a material selected from the group consisting of polypropylene, polyester, polyamide, polyacrylic and admixtures thereof;
laying down at least one layer of flame-resistant polyvinyl chloride fibers on the upper surface of said batt to at least substantially completely cover the upper surface of said batt;
needling said flame-resistant fibers into said batt to form a nonwoven, needled fabric; the volume of said polyvinyl chloride fibers being sufficient to form a needled fabric having an upper surface that is substantially completely polyvinyl chloride fibers and a lower surface that comprises polyvinyl chloride fibers in the range of about 1 to about 25 percent of the total fibers located at the lower surface of said needled fabric, the balance of the fibers located at the lower surface of said needled fabric being base fibers; and
heating the lower surface of the batt of said needled fabric to a temperature sufficient to adhere together the fibers positioned at said lower surface.

13. A method in accordance with claim 12 wherein said base fibers are polypropylene fibers.

14. A method in accordance with claim 13 wherein the lower surface of the batt of said needled fabric is contacted with a heated roller as the needled fabric is passed through the nip of a pair of rollers for heating said lower surface of the batt in said needled fabric.

15. A method in accordance with claim 14 wherein the step of needling the polyvinyl chloride fibers into said batt to form a nonwoven, needled fabric is accomplished by needling the composite of said batt and said at least one layer of polyvinyl chloride fibers only from the polyvinyl chloride layer side of the composite.

16. A method in accordance with claim 15 wherein the step of needling together a multiplicity of base fibers comprising subjecting said multiplicity of base fibers to needle punching in the range of about 300 to about 600 needle punches per square inch of the resulting needled batt.

17. A method in accordance with claim 16 wherein the polyvinyl chloride fibers laid down on the batt are randomly oriented.

18. A method in accordance with claim 16 wherein at least a portion of the polyvinyl chloride fibers laid down on the batt are oriented in a preselected direction.

19. A method for forming a flame-resistant, nonwoven fabric, comprising:
needling together a multiplicity of base fibers to form a nonwoven, needled batt having upper and lower surfaces, said base fibers being formed of a material selected from the group consisting of polypropylene, polyester, polyamide, polyacrylic and admixtures thereof;
laying down at least one layer of flame-resistant polyvinyl chloride fibers on the upper surface of said batt to at least substantially completely cover the upper surface of said batt;
needling said flame-resistant fibers into said batt to form a nonwoven, needled fabric; the volume of said polyvinyl chloride fibers being sufficient to form a needled fabric having an upper surface that is substantially completely polyvinyl chloride fibers and a lower surface that comprises polyvinyl chloride fibers in the range of about 35 to about 75 percent of the total fibers located at a lower surface of said needled fabric; and
heating the lower surface of the batt of said needled fabric to a temperature sufficient to adhere together the fibers positioned at said lower surface.

20. A flame-resistant, nonwoven fabric comprising:
a multiplicity of nonflame-resistant base fibers forming a needle-punched batt having upper and lower surfaces; and
at least one layer of flame-resistant fibers substantially completely covering and needle-punched into the upper surface of said batt.

21. A fabric in accordance with claim 20 wherein said flame-resistant fibers comprise polyvinyl chloride fibers.

22. A fabric in accordance with claim 20 wherein said batt comprises base fibers selected from the group consisting of fibers of polypropylene, polyester, polyamides, polyacrylics and mixtures thereof.

23. A fabric in accordance with claim 22 wherein said flame-resistant fibers comprise polyvinyl chloride fibers.

24. A fabric in accordance with claim 20 wherein said at least one layer of flame-resistant fibers is needled together with said batt.

25. A fabric in accordance with claim 24 wherein said multiplicity of base fibers forming said batt are needled together.

26. A fabric in accordance with claim 25 wherein said flame-resistant fibers comprise polyvinyl chloride fibers.

27. A flame-resistant nonwoven fabric comprising:
a multiplicity of base fibers forming a needle-punched batt having upper and lower surfaces; said base fibers being selected from the group consisting of fibers of polypropylene, polyester, polyamides, polyacrylics and mixtures thereof; and
at least one layer of flame-resistant fibers substantially completely covering and needle punched into the upper surface of said batt.

28. A fabric in accordance with claim 27 wherein said flame-resistant fibers comprise polyvinyl chloride fibers.

29. A fabric in accordance with claim 25 including a scrim carrier material associated with said batt.

30. A fabric in accordance with claim 25 wherein said polyvinyl chloride fibers are randomly oriented.

31. A fabric in accordance with claim 25 wherein said polyvinyl chloride fibers are oriented in a preselected direction.

32. A method for forming a flame-resistant nonwoven fabric, said method comprising:
laying down at least one layer of flame-resistant fibers on the upper surface of a needle-punched fiber batt of nonflame-resistant fibers to at least substantially completely cover the upper surface of said batt; and needling said flame-resistant fibers and said batt together to form said nonwoven fabric.

33. A method in accordance with claim 32 wherein said flame-resistant fibers comprise polyvinyl chloride fibers.

34. A method for forming a flame-resistant nonwoven fabric, said method comprising:

laying down at least one layer of flame-resistant fibers on the upper surface of a needle-punched fiber batt to at least substantially completely cover the upper surface of said batt; said batt comprising fibers selected from the group consisting of fibers of polypropylene, polyester, polyamides, polyacrylics and mixtures thereof; and needling said flame-resistant fibers and said batt together to form said nonwoven fabric.

35. A method in accordance with claim 34 wherein said flame-resistant fibers comprise polyvinyl chloride fibers.

36. A method in accordance with claim 34 additionally comprising needling together a multiplicity of base fibers to form said fiber batt.

37. A method in accordance with claim 36 wherein said flame resistant fibers comprise polyvinyl chloride fibers.

38. A method in accordance with claim 32 wherein said base fibers comprise fibers selected from the group consisting of fibers of polypropylene, polyester, polyamides, polyacrylics, and mixtures thereof.

39. A method in accordance with claim 38 wherein said flame-resistant fibers comprise polyvinyl chloride fibers.

40. A method in accordance with claim 36 additionally comprising heating the lower surface of said fabric to adhere together the fibers positioned at said lower surface.

41. A method in accordance with claim 40 wherein said flame-resistant fibers comprise polyvinyl chloride fibers.

42. A method in accordance with claim 41 wherein said base fibers comprise fibers of polypropylene.

* * * * *

UNITED STATES PATENT AND TRADEMARK OFFICE
CERTIFICATE OF CORRECTION

PATENT NO. : 4,194,037
DATED : March 18, 1980
INVENTOR(S) : Frederick L. Stoller It is certified that error appears in the above-identified patent and that said Letters Patent are hereby corrected as shown below:

Column 7, Claim 11, line 1, "less" should read --- base ---.

Column 8, Claim 24, line 34, "20" should read --- 27 ---.

Signed and Sealed this

Nineteenth Day of August 1980

[SEAL]

Attest:

SIDNEY A. DIAMOND

Attesting Officer

Commissioner of Patents and Trademarks